United States Patent
Yegnanarayanan

(10) Patent No.: US 7,023,566 B2
(45) Date of Patent: Apr. 4, 2006

(54) PAGE DESCRIPTION LANGUAGE ON DEMAND PRINTING

(75) Inventor: Viswanath Yegnanarayanan, Whittier, CA (US)

(73) Assignee: Xerox Corporation, Stamford, CT (US)

( * ) Notice: Subject to any disclaimer, the term of this patent is extended or adjusted under 35 U.S.C. 154(b) by 1151 days.

(21) Appl. No.: 09/737,216

(22) Filed: Dec. 12, 2000

(65) Prior Publication Data

US 2002/0080385 A1 Jun. 27, 2002

(51) Int. Cl.
    *G06F 15/00* (2006.01)
(52) U.S. Cl. ......... 358/1.1; 715/515
(58) Field of Classification Search ......... 358/1.1, 358/468, 1.14, 1.15, 1.16, 401, 1.9, 1.13; 703/21, 27; 715/503, 515; 356/73.1, 364
    See application file for complete search history.

(56) References Cited

U.S. PATENT DOCUMENTS

| | | | |
|---|---|---|---|
| 5,353,388 A * | 10/1994 | Motoyama | 358/1.18 |
| 5,402,527 A * | 3/1995 | Bigby et al. | 358/1.1 |
| 5,580,177 A | 12/1996 | Gase et al. | 400/61 |
| 5,819,014 A * | 10/1998 | Cyr et al. | 358/1.15 |
| 6,057,930 A * | 5/2000 | Blossey et al. | 358/1.15 |
| 6,088,120 A * | 7/2000 | Shibusawa et al. | 358/1.15 |
| 6,321,266 B1 * | 11/2001 | Yokomizo et al. | 709/226 |
| 6,456,388 B1 * | 9/2002 | Inoue et al. | 358/1.15 |
| 6,493,101 B1 * | 12/2002 | Okazawa | 358/1.15 |
| 6,515,759 B1 * | 2/2003 | Smith | 358/1.15 |
| 2002/0048046 A1 * | 4/2002 | Unno | 358/1.16 |

FOREIGN PATENT DOCUMENTS

| | | |
|---|---|---|
| EP | 0 716 371 A | 6/1996 |
| EP | 0 847 022 A | 6/1998 |

* cited by examiner

*Primary Examiner*—Kimberly Williams
*Assistant Examiner*—Saeid Ebrahimi
(74) *Attorney, Agent, or Firm*—Jeannette Walder

(57) ABSTRACT

A printer and associated programming for automatically requesting a PDL program from a storage site that is connected to the printer by a network for any document that requires a PDL program that is not already available to the printer. A computer for this purpose may be a user or host computer, or be built in to the printer. When the computer delivers a document to the printer, either the computer will request that the PDL program from storage to be sent to the printer, or the printer will determine which PDL program is needed by inspecting the received document, and request it when provided the location.

6 Claims, 1 Drawing Sheet

PAGE DESCRIPTION LANGUAGE ON DEMAND PRINTING

BACKGROUND OF THE INVENTION

A method of making available to a printer an application program for a document written in any page description language (PDL) by programming the printer to download the program through the Internet before using the program to print the document.

Documents can be written in any one of a number of page description languages, each one being optimized for a different type of use. Two examples are PCL and PostScript.

Printers may have a number of these application programs stored in memory or on an internal hard disk, and so can directly print most documents submitted to them. However, they may be incapable of printing a page in any other language. Adding languages to the printer, either as part of the initial purchase, or as an add-on later, would adversely affect the price. What would be advantageous in a printer would be a system for adapting a printer so that it would be able to get any program on demand as the need arises.

SUMMARY OF THE INVENTION

A printer that uses a particular page description language only occasionally could be programmed to automatically access that program by contacting the URL of the program vendor, downloading the program, and using a secured mechanism for all its communications. The transaction would be started by submitting the document to the printer, which would identify the particular language, either by reading a header or by examining the characteristics of the text to determine the language used.

A list of the languages that the printer could handle in this way, and prices for downloading, would be supplied to the user at the time of purchase of the printer, and would be updated at intervals thereafter, allowing the user to select languages.

In this way, a lower cost printer could be offered for sale having one, or no, page description languages built in, but having the ability to get any program as needed.

DETAILED DESCRIPTION OF THE INVENTION

Figure 1:
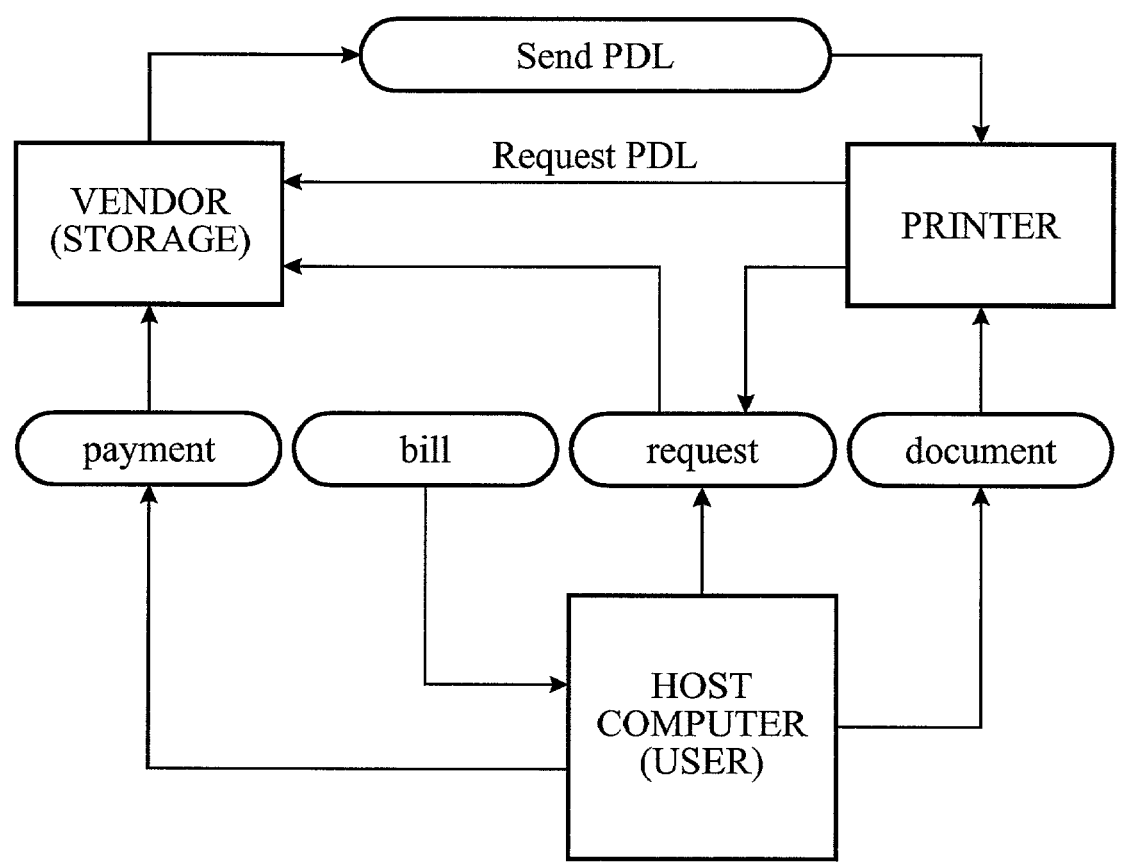
FIG. 1 is a block diagram of the process.

Large printers can support many PDL's. Usually a few PDL's are considered to be "core" and so they reside permanently on the controller ROM of the printer. However, many PDL's are offered as optional add-on's. These PDL's come on a SIMM/DIMM that can be plugged into the printer controller, or as files that can be copied to the printer's hard disk. Updates to the PDL's with newer versions are entered manually. That is, either a new SIMM/DIMM containing the PDL code is obtained and plugged in, or a new PDL file is copied onto the hard disk or the controller ROM of the printer. There are several limitations to the current approach. In addition to requiring manual intervention, the number of PDL's that can be supported by a printer is limited by the number of SIMM/DIMM slots available on the controller board, and by the amount of free disk space for printers that are equipped with a hard disk. For printers without a hard disk, users often have to remove a PDL SIMM/DIMM in order to free up a slot for installing another PDL.

To overcome these limitations, an administrator/operator can specify to a printer the PDL's that need to be loaded at a given time. The printer will fetch the specified PDL's from a network file server/workstation/repository, load them locally, and process jobs as if the PDL's were installed locally on the printer's hard disk or SIMM/DIMM. Optionally, the printer can be further requested to store one or more of the PDL's permanently on its hard disk or on a SIMM/DIMM. If the PDL's are not stored permanently, they are lost when the printer is powered off. After restart, the printer can be told to fetch either the same PDL's or a different set of PDL's from the same or different network device.

The software in a printer typically consists of a file download component, a remote disk mount component and a file system component. For a printer with a permanent storage device such as a hard disk, when the printer operator or system administrator wants a PDL such as TIFF to be installed/upgraded on a particular printer, he will send a PJL command followed by the location of where the latest version of TIFF is stored and made available. This location could be at a remote site. The printer interprets the PJL command and reads the location information, usually an IP address or URL. For those printers that are equipped with a permanent device, the file system component formats and creates a file system on this device, if necessary. The file download component then establishes a connection with the device where the PDL file is stored, authenticates itself, and proceeds to retrieve the PDL file. After the file has been successfully downloaded to the permanent storage device or to RAM, the printer restarts itself, and prints a test page to indicate that the upgrade has been successfully completed.

In a network environment, it is common for resources to be stored centrally on a file server or repository from which they can be distributed to clients. PDL files fit very well into this model. The operator or system administrator could specify a network file server or repository where PDL files and related resources such as fonts are stored to be made available on demand for any network client. Again, a PJL command is used to specify the location information. On receipt of this PJL command, the remote disk mount component on the printer will mount the remote disk and copy the PDL files onto its memory (RAM), SIMM/DIMM, or local hard disk as directed by the command. This is illustrated in FIG. 1. Once the PDL is loaded onto the printer, it can begin to process jobs. This feature can support a variable set of PDL's at different times based on user demand. There are no dependencies on the number free SIMM DIMM slots available on the printer controller board, or the requirement of free disk space or even for a hard disk to be present in the printer. The same printer can support a set of PDL's at a given time, and a different set of PDL's at another moment by means of remote PJL commands.

The advantages of this system are:

1) Third party PDL vendors may provide the PDL module, and later upgrades, at a web site.

2) There will be no manual intervention to install additional PDL's.

3) Centralized PDL distribution and upgrades. A single copy is made available on the LAN for multiple printers to use and discard as needed.

4) Eliminates need for PDL DIMM slots and helps reduce controller cost.

5) Helps security and privacy. Rather than be forced to print a private document on a shared printer because it supports the PDL for the document, a user can first enable the necessary PDL on his local/personal printer and then print private documents on it.

6) The user has the option to permanently store the PDL's either on the DIMM or the hard disk of his personal printer FIG. 1 is a diagram of this process. The first step is for the host to send a document to the printer. The host may know that the printer does not have the proper PDL, and request that the PDL be sent to the printer by the vendor. Alternatively, the printer may detect that a PDL is needed by reading a document header or by inspecting the characteristics of the document file, and request it. In either case the vendor sends a bill to the host which will send a return payment by a secured transaction. Finally the vendor sends the PDL to the printer. Any or all of these transmissions can be over the Internet.

In the event that the PDL program is stored on a hard drive that is accessible by the user without payment, the vendor is simply a storage area that can be accessed by a request, and no bill or payment is necessary.

Other types of resources, such as documents, fonts and forms, could be similarly automatically accessed by the computer or printer. In the case of a document, this same system could then acquire the appropriate PDL program if necessary.

While the invention has been described with reference to a specific embodiment, it will be understood by those skilled in the art that various changes may be made and equivalents may be substituted for elements thereof without departing from the true spirit and scope of the invention. In addition, many modifications may be made without departing from the essential teachings of the invention.

What is claimed is:

1. In a printing system, a method of page description (PDL) on demand printing, comprising:
   receiving a document file to be printed, wherein the document file comprises image data written in a page description language;
   identifying the page description language used to generate the document file;
   if a PDL interpreter for the identified page description language is not stored locally in the printing system, locating a PDL interpreter for the identified page description language external to the printing system;
   wherein locating a PDL interpreter for the identified page description language external to the printing system comprises locating the PDL interpreter at a vending means and further comprising:
      sending a request for the PDL interpreter to the vending means;
      responsive to a receipt of a bill for the PDL interpreter from the vending means, sending a payment to a vending means for the PDL interpreter; and
   upon receipt of the payment, the vending means authorizes downloading of the PDL interpreter by the printing system;
   downloading the identified PDL interpreter;
   executing the PDL interpreter to transform the document file into a form of data operative by the printing system; and
   printing the document file.

2. The method of claim 1, wherein identifying the page description language comprises reading a header in the document file.

3. The method of claim 1, wherein identifying the page description language comprises examining characteristics of the image data to determine the page description language used.

4. The method of claim 1, further comprising deleting the PDL interpreter from the system after printing the document file.

5. The method of claim 1, wherein locating a PDL interpreter comprises accessing a file server repository on a network.

6. The method of claim 1, wherein downloading the identified PDL interpreter comprises downloading the identified PDL interpreter to fixed storage in the printing system.

* * * * *